United States Patent Office 3,816,442
Patented June 11, 1974

3,816,442
PULVERIZED POLYMER SOLUTION OR DISPERSION, A POLYMER POWDER, A PROCESS OF PRODUCTION THEREOF AND A POWDER COATING TECHNIQUE
Karl Mueller, Kufstein, Austria, assignor to Ciba-Geigy A.G., Basel, Switzerland
No Drawing. Filed Mar. 23, 1972, Ser. No. 237,560
Claims priority, application Austria, June 16, 1971, A 5,194/71
Int. Cl. C08g 51/34, 51/40, 51/44
U.S. Cl. 260—30.2
13 Claims

ABSTRACT OF THE DISCLOSURE

This invention relates to solid thermoplastic polymer containing particles. From these particles pure, porous polymeric particles of medium to high particle fineness can be obtained. These polymer particles can be applied by means of a powder coating technique on the surface of an object and sintered thereon to form a thermoplastic film. These porous polymer particles can be further used as filter elements, chromatographic absorbers and in rotational casting.

---

A further object of this invention is a process for producing said thermoplastic polymer containing particles, which can be applied directly by means of a powder coating technique on the surface of an object and sintered thereon to form a thermoplastic film.

Several methods are known for the production of polymer powders with a particle size range below 500 microns. In a very common method the polymer is ground to the desired particle range by means of special mills, or in what are called micronizers employing ultrasonic waves. This method is not generally applicable. Many polymers including a great number of the thermoplasts of high molecular weight are extremely difficult to convert into finely particulated form by mechanical grain size reduction; with some this is in fact impracticable and expensive. The desired reduction in particle size can be achieved only by using complex grinding machines and employing substantial amounts of energy. The necessary energy employed can be either in the form of mechanical disintegration energy or in the form of thermal energy by cooling the polymer to low temperatures and grinding the cooled polymer. A viscous polymer of high molecular weight can be mechanically reduced to the desired particle size range only by these means.

In another method the polymer is dissolved in a solvent and precipitated from it in powder form. The precipitation method includes either a precipitating agent or cooling the solution, after which the solvent is separated by filtration, centrifuging or some other physical separating technique. It has now been found that this method for producing a polymer powder has the serious disadvantage that the range of particle sizes cannot be controlled, or can be controlled to some extent. Since precipitation from the liquid quasi one-phase solution results in a two-phase system of liquid solvent and solid polymer particles, the crystallinity, the particle fineness and the particle shape thereof are dependent upon precipitating conditions. Lengthy tests are necessary to determine the optimum precipitating conditions and the choice of appropriate precipitating agent and its amount or the cooling conditions. These conditions have to be strictly observed and carefully controlled, and even so it is possible only in some cases to obtain a powder with a predetermined particle size distribution. These difficulties are further illustrated in British Patent No. 1,150,038.

Therefore in the recently published German Offenlegungsschrift No. 1,805,138 it is proposed that the polymer should be melted in the matrix of a solid auxiliary powder with a melting point higher than that of the polymer. The auxiliary powder is removed thereafter to leave a fine polymer powder. This method again is of limited applicability as it often has to be carried out in the total absence of oxygen, and even in the absence of oxygen many polymers cannot be heated to temperatures above their melting points without self-decomposition. Further, it is stated in this patent application that the volume ratio of polymer powder to auxiliary powder may not exceed a certain value, which is not specified, otherwise a continuous polymer film will be formed thereby preventing formation of a powder.

In the German Auslegeschrift No. 1,273,182 it is proposed to prepare nitrocellulose powder by heating fibrous nitrocellulose in an aqueous dispersion with plasticizing dimethyl terephthalate at temperatures above the melting point of the same, the material which hardens during cooling of the dispersion is ground and the dimethyl terephthalate is removed by water vapor distillation or by extraction with a solvent which does not swell the nitrocellulose, thereby obtaining nitrocellulose in finely divided form.

The sole example of the German Auslegeschrift establishes that the nitrocellulose is chemically decomposed and degraded. This is demonstrated by viscosity measurements made before and after the completion of the test. Besides, the difficulty of maintaining the temperature constant during the test, the yellowish-grey color of the material obtained, the yellow discoloration of the separated water in which nitrate ions are detectable, and the low pH-value of the water confirm such decomposition and degradation. Blank tests show that benzene extraction does not influence the viscosity of nitrocellulose.

Execution of the procedure according to the German Auslegeschrift leads but to a fictitious improvement of the grindability of nitrocellulose which, however, is only achieved by chemical decomposition of nitrocellulose.

It is an object of the present invention to produce a solid polymer containing particles which are free from the aforestated disadvantages, which particles can be used per se or from which a polymer powder can be obtained by simple means.

It is a further object of this invention to create a process by which said solid polymer solution in powder form can be produced which process is free from the aforestated prior art disadvantages.

The invention resides in the concept of a solution, dispersion or the like of polymer particles with a particle size range preferably below 500 microns. This solution dispersion or the like contains from 1 to a maximum of 100, preferably from 5 to 100 and in particular from 5 to 50 parts by weight and not more than the saturation concentration of a thermoplastic polymer (with a melting point of at least 50° C.) and 100 parts by weight of a moldable anhydrous organic solvent, being solid at 25° C., having a molecular weight below 1000, more preferably below 500, which solvent is stable at temperatures above its melting point and chemically inert to the polymer at these temperatures, i.e. the dissolving conditions, and at temperatures above its melting point has a dissolving power of at least 1 part of polymer per 100 parts by weight of solvent.

The polymer powder solution, dispersion or the like may have a particle size range below 400, below 315, below 200, below 90, below 40 or below 10 microns according to the variable fields or powder applications.

A polymer powder employed in a whirl sinter process should have a particle size range between 20 to 400 microns, preferably 40 to 315 microns; a polymer powder employed in an electrostatic powder coating technique should have a particle size range between 40 to 90 microns.

The polymer component of the solid polymer solution is preferably one formed by (a) condensation polymerization, or e.g. polyethylene terephthalate of a molecular weight of approximately 25,000, M.P. 265° C.; poly(1,4)butylenterephthalate of a molecular weight of 30,000, M.P. 225° C.; polycaprolactone of moleculare weight of 40,000, M.P. 60° C.; polycarbonate of phosgene and 4,4′-dihydroxy diphenyl-2,2-propane of molecular weight of approximately 100,000, M.P. 220–230° C.

(b) addition polymerization: Desmopan polyurethane (Shore hardness 98).

(c) double-bond polymerization: e.g. low density polyethylene (0.92 g./cm.³, molecular weight 20,000 to 50,000) or high density polyethylene (0.95 g./cm.³, molecular weight up to 250,000).

(d) dispersion polymerization: a polystyrene of a Vicat point of 110 and a melt index of 2.5 g./10 minutes.

(e) emulsion polymerization or (f) suspension polymerization: polyvinylchloride having a relative viscosity of 2.45, measured with a solution of 1 percent of the polymer in tetrahydrofurane at 30° C.

The preferred polymers are those which have in the monomer unit the groups

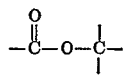

e.g. thermoplastic polyesters or

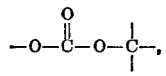

e.g. polycarbonates and the polymers formed by double-bond polymerization, e.g. polyolefines.

Of the synthetic polymers which can be converted into solid solutions in powder form and subsequently into polymer powders in accordance with this invention, the thermoplastic polymers and their mixtures take first place. The term "thermoplastic" refers to polymers being deformable by applied heat and pressure without any accompanying chemical change. The feature is that the deformation can be repeated. The molecule of these high polymers is of basically filamentary shape, but polymers which, although branched or even crosslinked to some slight extent, are included, if they show thermoplasticity. In addition prepolymers of thermosetting plastics which behave like thermoplastics can be converted into fine powders in accordance with this invention.

The preferred embodiment of the present invention embraces a solid solution in powder form of a highly viscous-elastic polymer. In accordance with the presest invention a polymer can be regarded of highly viscous-elastic characteristics if the pure or plasticized polymer (e.g. polyvinylchloride plasticized) in granular form of overall dimensions between 1 to 5 mm. after one grinding operation in a pin disk mill of the "Alpine-Augsburg" type, Kolloplex 160 Z, at a grinding capacity of between 10 and 25 kilograms an hour and at 14,000 revolutions per minute (r.p.m.) has a particle size range with a fraction of at least 10 percent or preferably at least 30 percent by weight, relative to the total charge of polymer, greater than 125 microns (measured with test screens as specified in German DIN 4 188). The grinding operation is carried out in the presence of a liquid nitrogen cooling, with a temperature of the granular polymer fed to the mill of −160 to −180° C. If following the grinding operation as described above a non-free flowing powder is obtained the range of particle size thereof is determined by microscopic measurement or by sedimentation analysis.

The solvent being solid at 25° C. which is used to produce the pulverized polymer solution, dispersion or the like, besides having the physical and chemical properties already noted, must be readily grindable without applying liquid nitrogen cooling. In accordance with the present invention a solvent can be considered as grindable, if after one grinding operation at room temperature in the pin disk mill specified above at a grinding capacity of 30–50 kilograms an hour at 7,100 r.p.m. the average particle size of particles dispersed in an inert liquid medium determined by microscopy is 100 microns or preferably 40 microns at the maximum. This grinding operation is a simple criterion for determining whether a given solid solvent is well grindable and can be employed for the production of a solid polymer solution in powder form.

The selected solvent must be stable under the dissolving conditions, i.e. at temperatures above its melting point, (the melting point of said solvent in a preferred embodiment lies between 40 and 250° C., in particular between 75° and 200° C.) and over a temperature range sufficiently wide for the polymer to dissolve in the solvent. The solvent must not chemically react with the polymer under the dissolving conditions and must not appreciably reduce the molecular weight of the dissolving polymer, as reduction of the molecular weight is accompanied by deterioration in the mechanical properties. In particular the loss of molecular weight should be less than 20 percent. For the same reason the solvent must be free of water, because water tends to reduce the molecular weight of the polymer. In the production of the powdery solutions mixtures of solid solvents can be employed, if their respective melting point does not fall below 25° C.

Without imposing limits on the applicability of this invention some of the solid solvents are named. These are the 2 to 4 aromatic nuclei containing aromatic hydrocarbons, which are solid at 25° C., e.g. naphthalene, diphenyl, anthracene, 1,1-bisnaphthyl, 1,2-bisnaphthyl, 2,2-bisnaphthyl and solid hydrogenated or alkylated aromatic hydrocarbons containing 2 aromatic nuclei, e.g. 9,10- dihydroanthracene, fluorene, acenaphthene, 2-methylnaphthalene.

Some of these solvents sublime, therefore autoclaves are used for dissolving polymer therein. Other suitable solvents are the solid aryl esters of aromatic monocarboxylic acids, such as the phenyl and naphthyl esters of benzoic acid, the solid dialkyl and diaryl esters of aromatic dicarboxylic acids, the aromatic acid residue containing 1 or 2 aromatic nuclei, e.g. dimethyl terephthalate, dimethyl isophthalate, naphthalene dicarboxylic acid-(1,6)-dimethyl ester, phthalic acid diphenyl ester; the di-(hydroxyalkyl)-esters of aromatic dicarboxylic acids, the hydroxy-alkyl group thereof containing 2 to 4 carbon atoms, the aromatic dicarboxylic acid thereof containing 1 to 2 aromatic nuclei, e.g. bis-(hydroxyethyl)terephthalate, bis-(hydroxyethyl)-naphthalene dicarboxylate-(1,6); cyclic lactams, e.g. ε-caprolactam; quinones, e.g. benzoquinones, 2-alkylanthraquinones, the alkyl group thereof containing 2 to 4 carbon atoms, e.g. 2-ethyl anthraquinone; cyclic ketones, e.g. camphor; diaryl ketones, e.g. benzophenone; solid alkyl derivatives of urea, the alkyl group containing 1 to 4 carbon atoms, e.g. N,N′- and N,N-dimethyl urea, trimethyl urea, aryl derivatives of urea, the aryl group containing 1 aromatic nucleus, e.g. phenyl-urea, N,N- and N,N′-diphenyl urea; phenylurethane; solid monovalent and divalent phenols, e.g. α- and β-naphthol, 4-hydroxydiphenyl, 4,4′-dihydroxydiphenyl-2,2-propane, o-, and p-cresol; o,o′-diphenol, benzil; solid aliphatic cyclic carbonates, e.g. ethylene carbonate, carbonic acid diarylester, the aryl group containing 1 aromatic nucleus, e.g. diphenylcarbonate, solid halogenated aromatic hydrocarbons containing 1 to 2 aromatic nuclei, e.g. 2-chloronaphthalene, solid halogenated phenols, e.g. 1,4 dichlorophenol, 2,2′-methylene bis-(3,4,6-trichlorophenol); solid chlorinated alicyclic hydrocarbons e.g. 1,2,3,4,5,6-hexachlorocyclohexane and solid halogenated aliphatic hydrocarbons containing 2 to 6 carbon atoms, e.g. hexachloroethane, which sublimes at 185° C. and should be used as a solvent in an autoclave; further solid phenol ethers, e.g. diphenylene oxide; solid acid amides, e.g. diphenyl formamide, N-cyclohexyl succinimide, N-methylcyclohexylsuccinimide, N - dimethylcyclohexylsuccinimide and N-methylphthalimide.

The thermoplastic polymers suitable for conversion into solid solutions in fine powder form generally have a melting point between 50° C. and 300° C. and include thermoplastic polyesters, e.g. polyethylene terephthalate, polybis-(1,4-hydroxymethyl)-cyclohexene terephthalate, poly-1,4-butylene terephthalate and copolyesters thereof; polycarbonates, e.g. the polycarboxylic acid esters of 4,4'-dihydroxy-diphenyl-2,2-propane (such as carbonic acid ester of 4,4'-dihydroxydiphenyl-2,2-propane), polylactones, e.g. polycaprolactone, polypivalolactone; polyalkylene ether, e.g. polyoxymethylene; polyarylene ether, e.g. polyphenyleneoxide; polyolefines, e.g. polyethylene, polypropylene; polymethacrylate or polyalkylmethacrylates, e.g. polymethyl methacrylate, polyacrylonitrile; polystyrene and copolymers; polyurethanes, e.g. Desmopan; polyvinyl acetate, polyvinylether; polyvinylcarbazole; polyvinylchloride; polyvinylidene chloride, polyvinyl-pyridine. Mixtures of these poymers can be processed into solid solutions in powder form as well in accordance with the present invention.

The new polymer powder solution or new polymer containing particles can be applied directly without removal of the solid solvent, on the surface of an object by means of a powder coating technique, followed by a heat treatment of the powder on the object. This heat treatment can be fusing or sintering the powder respectively the particles to form a thermoplastic heat-insulating anticorrosive protective coating on the surface of the coated object. This technique is applied preferably if a solid solvent is used with a melting point range preferably between 75° C. and the melting point of the polymer employed. All the standard powder coating techniques are suitable to obtain a solid solvent containing thermoplastic heat-insulating anticorrosive film but those coating techniques are the preferred ones which do not apply heat treatment during the coating step per se. In processes involving heating, either of the powdery solution or of the surface to which the solution is applied, separation or segregation between the polymer powder and the powdery solvent may take place.

Therefore the preferred powder coating methods to obtain a solvent containing homogeneous and regular thermoplastic protective film are those employing an electrostatic coating technique or calender coating technique or powder film coating, whereby the coating compound is mechanically spread on the surface of the object to be coated.

If a polymer composition containing a sublimable solid solvent, e.g. naphthalene, dimethyl terephthalate, camphor, anthracene, hexachloroethane is used as coating composition in a powder coating technique which involves heating of the powder during its application on an object or more preferably heating of the object coated by the powder simultaneously sublimation of the solid solvent takes place. This process shows up advantage with other coating processes if a substantially solvent-free coating is desired since physical separation of the solvent coincides with the coating of the object. The solvent which sublimes off during the heating step can be regenerated as a sublimate on cooling surfaces, such as cooling ribs, coils, columns or fins. This regeneration process avoids air pollution and can be performed much more easily and less expensive than the separation of the conventional liquid solvents, used in lacquer and paint industries.

If the coating compound produced by the present process is applied electrostatically, the solid solvent chosen must be electrostatically chargeable, and consequently must be free of water and not highly hygroscopic.

The wide range of selection between solid solvents of different chemical and physical characteristics permits to modify the properties of the films obtained to a high extent. By the selective use of the various low molecular solid solvents, for instance the adhesion of the film on the surface to which it is applied can be controlled. Powdery copolyester-naphthalene or powdery copolyester-dimethyl terephthalate coating compositions yield permanent films showing excellent adhesion and hardness determined with the cuping test an coatings by Erichsen method DIN 53 156 (>9 mm.), oscillation test of 180–240 sec. with the pendulum apparatus (DIN 53 157) and produce adhesion test (DIN 53 151) cross-cut values of GTO, whereas the films formed from a coating composition of the same copolyester but ε-caprolactam as solid solvent could be regarded as temporal protective coatings which can be stripped from the surface. If only temporal and cheap protective coatings are desired, which can be easily stripped from the surface of the object to be coated amounts of 1 to 5 percent by weight of the coating composition of waxes and paraffines advantageously are added.

Following Table 1 represents a summary of thermoplastic polymers which can be worked into pulverized solutions by means of a number of coordinated solid solvents in accordance with the process of the present invention but without limiting its scope.

TABLE 1

| Polymer | Solid solvent (number) | Melting point of solid solvent (° C.) |
|---|---|---|
| Polyethylene terephthalate, polybutylene terephthalate, poly(1,4-bis-hydroxymethylcyclohexylterephthalate); copolyesters (terephthalic and/or isophthalic acid residues containing with a melting range from 100 to 250° C.), e.g. copolyesters disclosed in U.S. Pat. Nos. 2,965,613, 2,973,339, 3,409,132, 3,558,557 and 3,535,286, British Pat. Nos. 915,779, 684,651 and 1,029,136 and German Offenlegungsschrift No. 1,770,044 polyethylene isophthalate. | Naphthalene (1) | 78–79 |
| | Diphenyl (2) | 70 |
| | Anthracene (3) | 218 |
| | 1,1-bis-naphthyl (4) | 157 |
| | 2,2'-bis-naphthyl (5) | 187–189 |
| | Fluorene (6) | 114 |
| | Acenaphthene (7) | 95 |
| | 1,2,4,5-tetramethylbenzene (8) | 81–82 |
| | 2-methylnaphthalene (9) | 34 |
| | Dimethylterephthalate (11) | 140 |
| | Dimethylisophthalate (12) | 71 |
| | ε-Caprolactam (13) | 69–70 |
| | 2-ethylanthraquinone (14) | 108 |
| | Camphor (15) | 176–177 |
| | Benzophenone (rhombic modification) (16) | 48 |
| | N,N-dimethyl urea (17) | 99–100 |
| | N,N'-dimethyl urea (18) | 182–185 |
| | Trimethyl urea (19) | 76 |
| | N,N'-diphenyl urea (20) | 189 |
| | 9,10-dihydroanthracene (38) | 108 |
| | Phthalic acid dicyclohexylester (41) | 58 |
| Polyethylene terephthalate, polybutylene terephthalate and copolyesters (continued) polyethylene isophthalate. | α-Naphthol (21) | 95 |
| | β-Naphthol (22) | 122 |
| | 4-hydroxydiphenyl (23) | 163 |
| | 4,4'-dihydroxydiphenyl-2-2-propane (24) | 152 |
| | 2,6-dimethylphenol (25) | 71 |
| | o-Cresol (26) | 32 |
| | p-Cresol (27) | 36 |
| | Phenol (28) | 40–42 |
| | Resorcinol (29) | 110 |
| | o,o'-Diphenyl (30) | 109 |
| | Benzil (31) | 95 |
| | 2-chloronaphthalene (32) | 56 |
| | p-Dichlorobenzene (33) | 54 |
| | 4-chlorophenol (34) | 43 |
| | Hexachloroethanenaphthalene (eutectoid mixture: 38 parts by weight hexachloroethane and 62 parts by weight naphthalene) (35) | 57 |
| | Diphenylene oxide (36) | 83 |
| | N-methylphthalimide (37) | 132–134 |
| | N-cyclohexylsuccinimide (39) | 44 |
| | Diphenyl carbonate (40) | 79 |
| Polycarbonate of phosgene and 4,4'-dihydroxy-diphenyl-2,2-propane (disclosed e.g. in French Pat. No. 1,361,276). | (1), (4), (6), (8), (9) benzoic acid phenyl ester (10), (11), (12), (13), (21), (22), (23), (36), (38), (39). | 71 |
| Polypivalolactone (disclosed, e.g. in British Pat. No. 1,171,822, in German Offenlegungsschrift No. 1,809,560 and in German Auslegeschrift No. 1,520,874. | (1), (11), (12), (13), (40), (41) | (¹) |
| Poly-p-phenylene oxide (disclosed e.g. in Kunststoffe 1965, p. 254). | (1), (13), (15), (16), (33), (40), (41). | (¹) |

TABLE I—Continued

| Polymer | Solid solvent (number) | Melting point of solid solvent (° C.) |
|---|---|---|
| Polyethylene (disclosed e.g. in British Pat. No. 471,590, Belgian Pat. Nos. 533,362 and 530,617) polypropylene (e.g. disclosed in U.S. Pat. No. 3,335,121). | (1), (2), (8), (13), (16), (33), (36), (39), (15). | (1) |
| Polymethylmethacrylate (e.g. disclosed in Luskin et al. "Manufacture of Arylic Polymers" in W. M. Smith "Polymer Manufacturing and Processing," Reinhold 1964). | (1), (13), (14), (16), (21), (22), (29), (33), (40). | (1) |
| Polystyrene (prepared e.g. as disclosed in German Pat. No. 634,278, in U.S. Pat. Nos. 2,656,334 and 2,673,194). | (1), (2), (6), (7), (8), (16), (34), (38), (40), (41). | (1) |
| Desmopane polyurethane (Bayer) (disclosed in: Technische Information "Eigenschaften, Anwendung, Verarbeitung"—Technische Information 1 (Bayer) Bestell Nr. PU 52002, Ausgabe: 1, 18, 1971). | (1) | (1) |
| Polyvinylacetate (disclosed in German Auslegeschrift No. 1,145,794 and 1,155,244 and in Österr. Chemiker Zeitung 1963, pp. 33–35) polyvinylbutyral (disclosed in Japanese Patent No. 446,472). | (1), (2), (7), (8), (9), (16), (36), (38), (39), (41). | (1) |
| Polyvinylchloride (disclosed in British Pat. No. 641,442), U.S. Pat. No. 3,042,665,) polyvinylidenechloride (Saran, as described in U.S. Pat. No. 2,968,651). | (1), (2), (7), (8), (9), (12), (13), (16), (28), (35), (36), (39), (40), (41). | (1) |
| Polyoxymethylene (prepared according to U.S. Pat. Nos. 2,296,249, 2,768,994, 2,828,286 and 2,994,687). | (1), (11), (12), (16), (33), (34). | (1) |

1 See above.

The present invention further embraces powders or particles of thermoplastic resins dissolved and uniformly dispersed in solid solvents which compounds can be used as adhesive powders. The solid solvents selected for this purpose must have a relatively low melting range between 30° to 150° C., preferably between 40° and 130° C.

The preferred polymers selected for this purpose are polycondensation polymers selected from the group of polyethylene terephthalate, polypropylene terephthalate, polybutylene terephthalate and copolyesters thereof; carbonic acid ester of 4,4'-dihydroxydiphenyl-2-2-propane and copolycarbonates thereof; polyoxymethylene; polyurethanes and double bond polymerization polymers selected from the group consisting of polyvinyl acetate and polyvinylchloride. The preferred solid solvents are hydroquinones, solid alkyl derivatives of urea, the alkyl group containing 1 to 4 carbon atoms, phenylurethane, solid monovalent and divalent phenols, e.g. α- and β-naphthol, 4,4'-dihydroxydiphenyl-2,2-propane, o- and p-cresol; o,o'-diphenol and resorcinol, solid halogenated phenols containing 1 or 2 aromatic nuclei; e.g. 1,4-chlorophenol, 3,4,6,-trichlorophenol and 2,2'-methylene-bis-(3,4,6-trichlorophenol), N-cyclohexylsuccinimide, N-methylcyclohexylsuccinimide or N-dimethylcyclohexylsuccinimide. The adhesive powder contains 2 to 50, preferably 2 to 20, parts by weight of the polymer dissolved and uniformly dispersed in the solid solvent constituting 100 parts by weight. The adhesive powder is applied on the surface of an object by a known technique, for example spread by means of a powder dispenser on a tape and activated thereon by a heat treatment whereby the solid solvent fuses or softens and forms an adhesive layer on those areas of the tape to be bonded to another layer of an object. The bond between the two layers is consolidated by applied heat and pressure treatment. The adhesive powder can be applied in bonding a metallic, plastic, glass, paper, ceramic or wood layer to another layer being selected from the group consisting of metal, plastic, glass, paper, ceramics or wood.

The polymeric powder or particles produced in accordance with the present invention can be processed into porous moulded articles or microporous diaphragms according to known procedures described in British Patent 766,139 and German Auslegeschrift 1,174,973. The solid solvent employed in the production of porous moulded articles should be extractable with water or the common liquid solvents.

Some of the described powder compounds can be employed as cosmetic powders or powders with enduring aroma such as polyethylene terephthalate-camphor compounds of a particle size range of less than 40 microns, preferably less than 10 microns. Other powders can be used as carriers of insecticides or bacteriostatica with an enduring insecticide or bacteriostatic efficiency, e.g. pulverized solutions of polyvinylchloride dissolved in hexachloroethane and naphthalene (35) or in 2,2'-methylene-bis(3,4,6-trichlorophenol).

The process of this invention for the production of polymer powder solutions, dispersions and the like comprises the steps (a) heating 1 to 100 parts by weight, (at most saturation concentration) of an above-defined thermoplastic polymer, which is solid at 25° C. with 100 parts by weight of an above-defined solid organic solvent up to a temperature above the melting point of said solvent until a substantially homogeneous liquid mixture or solution is formed, which solution contains said polymer dissolved or uniformly dispersed therein (b) cooling said solution to a temperature below the melting point of said solvent thereby solidifying said liquid mixture (c) comminuting the solidified mixture or solution until a powder or particles having a particle size of below 500 microns are obtained.

If necessary the process of this invention includes subsequent to step (c) additional screening operations, which are employed if a powder of a certain particle size range, for example of 40 to 90 microns is required. The desired solution or dispersion or the like of the polymer (containing said polymer in dissolved or uniformly dispersed form therein) is obtained when, on addition of the polymer at elevated temperature, the resulting melt of the solvent is clear or shows at most only slight opalescence. In a preferred embodiment of this invention the melt should be saturated with the polymer, but no polymer should remain undissolved; if an undissolved residue is left, further solvent can be added or the temperature of the melt increased until the polymer goes into solution.

The polymer can be added to the solvent melt in any desired form, e.g. comminuted or uncomminuted. The process permits the production of polymer powder compounds or polymer particles starting from granules, fibre material, sheet, film or foil waste or scrap. The dissolution time varies from a few minutes to 10 hours depending on the factors controlling the dissolving rate, such as material form, charge size, amount of material to be dissolved in a certain amount of solid solvent etc.

In a preferred embodiment the dissolving step (a) is carried out at temperatures between the melting point of said organic solvent and the melting point or melting range of the polymer, e.g. between 50° C. and 250° C., preferably between 80° C. and 200° C. This permits preserving polymer (to be comminuted) which is subject to thermal decomposition at temperatures above its melting point. Polymer which does not decompose at temperatures above its melting point can, as an alternative to comminution be converted into a melt before addition to the solvent melt. This procedure considerably shortens the dissolving time.

The cooling step (b) should be at such a cooling rate as to prevent deposition of the pure polymer. If during the cooling step the melt becomes muddy or opaque according to segregating polymer particles without solidification of the melt, the cooling rate can be regarded as too low. Preferably the mixture is reheated again until a substantially transparent liquid mixture or solution is formed, and the cooling step is repeated with a higher cooling rate. A preferred realization of the cooling step consists in pouring out the melt on the surface of a chilled object or applying running water cooling.

The essential concept of my process for the reduction of polymer particle size and its main advantage over the prior art processes resides in the fact that all thermoplastic polymers can be comminuted to a particle size range of below 500µ irrespective of their grindability employing simple and conventional size reduction machinery without additional liquid inert gas cooling thereby avoiding the disadvantages of formation of two distinct phases and simultaneous undesirable polymer fractionation processes, which phenomena constitute some of the main features of the known precipitation method.

By grinding, screening or sifting, according to the intended further use, solid polymer solutions with the desired particle size range can be obtained. The required grinding step (c) can be performed in all types of mills, e.g. disintegrators, conical grinders, bowl mills, hammer mills, jet mills, disk attrition mills, impact mills, cross beater mills, laboratory mills, swing mills, pinned disk mills, micronizers. It is an advantage of the comminution technique disclosed herein that a polymer powder of high particle fineness can be obtained even with types of mills, which normally cannot be used in grinding thermoplastic polymers, e.g. with ball mills. In comparison with known processes for the production of polymer powders, the process of this invention offers a number of further advantages. The specified solid solvents with a melting point above 25° C. dissolve high molecular polymers which are not dissolved by many of the known liquid solvents. The solid solvents mostly show considerably lower volatility and toxicity than many standard liquid solvents, and are easier to handle. When liquid solvents are used, pigments and other additives can only be incorporated in the final powders as a rule, since separation effects are likely to occur in the powder precipitation step if they are present earlier. Since the process for the production of polymer solutions as disclosed herein is entirely free from separation effects a superior state of distribution of additives in the polymer powder can be achieved. The predominantly high dissolving power of the solid solvents permits polymers of very high molecular weight to be pigmented under mild conditions at temperatures below their melting points. Besides the well reproducible grinding and screening operations, powders of higher particle fineness can be obtained by processing the polymer at lower concentrations relative to the solid solvents. If the polymer concentration is too high, respectively gets up to amounts above 50 percent of the solid solution, its grindability appreciably reduces.

The solid polymer solution disclosed herein enables the production of a 100 percent polymer powder with a particle size range below 500 microns. The process leading to pure polymer powders or particles comprises the separation of the solid solvent from the solid polymer solution, dispersion or the like by physical separation operations, carried out at temperatures below the polymer melting point, preferably below its sticking point. Suitable physical separation methods include distillation of the solid solvent, if necessary with vacuum, sublimation of the solid solvent, elutriation or extraction of the solid solvent with a liquid solvent, steam distillation, fluid bed sublimation as described by G. Matz in Chemie Ingenieur Technik 30, 319 (1958). The expression "sticking temperature" is used herein to correspond with the definition specified in "Preparatory Methods of Polymer Chemistry" by W. R. Sorenson and T. W. Campbell, Interscience Publishers (1961), page 49, as so called "polymer-melting temperature."

Employing these processes polymer powders can be obtained with particle size ranges below 315, 200, 125, 90, 40 or even 10 microns. Polymer powders with particle size ranges of 20 to 400, preferably 40 to 315 or in particular 40 to 90 microns can be readily obtained depending on the grinding and screening conditions.

The particular process chosen for separation of the solid solvent depends mainly on the physical and chemical properties of the solvent and of the polymer to be separated.

If, for example, a liquid solvent is used for elutriating or extraction purposes, it must have sufficient dissolving power for the solid solvent but must not dissolve or chemically attack the polymer. Examples of liquid solvents which can be used with good results are water, liquid alcohols having 1 to 6 carbon atoms, ethers, acetone, carbon disulphide, benzene, chlorobenzene, acetic acid, carbon tetrachloride, chloroform, hexane, toluene, ethyl acetate, nitrobenzene, pyridine, quinoline, petroleum ether, methyl cyclopentane, dioxan, dimethyl formamide, chlorinated hydrocarbons and dilute alkali solution.

The following Table 2 represents a summary of solid solvents, which can be removed from polymeric powder solutions or polymer containing particles by means of a number of coordinated liquid solvents in accordance with the process of the present invention but without limiting its scope.

TABLE 2

| Solid solvent | Preferred liquid solvents used in extraction or elutriation of solid solvent |
|---|---|
| Naphthalene | Chloroform, carbon tetrachloride, absolute ethyl alcohol, carbon disulphide, benzene, ethyl ether, methyl cyclopentane, tetramethyl urea, dimethyl sulfoxide, chlorobenzene. |
| Diphenyl | Tetramethyl urea, chlorobenzene. |
| Anthracene | Alcohols, ethyl ether, chloroform, carbon disulphide, glacial acetic ester, benzene, petrol ether, ethyl acetate, cymene, tetramethyl urea. |
| 9,10-dihydroanthracene | Ethyl alcohol, ethers, benzene, quinoline, petrol ether. |
| Acenaphthene | Ethyl alcohol, chloroform, benzene. |
| Fluorene | Ethyl alcohol, ethyl ether, benzene, carbon disulphide. |
| Benzoic acid phenyl ester | Ethyl ether, ethyl alcohol. |
| Terephthalic dimethyl ester Isophthalic acid dimethyl ester | Alcohol, ethers, chloroform, dimethyl sulfoxide, dimethyl formamide. |
| ε-Caprolactam | Water, alcohols, ethers, tetramethyl urea. |
| Benzoquinone | Water, alcohols, ether, aqueous alkali, ligroin, dimethyl formamide, petrol ether, hexane, benzene, acetone, tetramethyl urea. |
| 2-ethyl anthraquinone | Glacial acetic acid, alcohols. |
| Camphor | Ethyl ether, acetone, carbon disulphide, benzene, chlorobenzene. |
| Benzophenone | Ethyl alcohol, ethers, glacial acetic acid, chloroform, hexane, dioxane, 1,2-dichloroethane, dimethyl formamide. |
| N,N-dimethyl urea | Water, glacial acetic acid, alcohols, tetramethyl urea, dimethyl form amide. |
| α-Naphthol β-Naphthol | Alcohols, ethyl ether, chloroform, benzene. |
| o-Cresol | Alcohols, ethers, chloroform, diluted alkali. |
| 4,4'-dihydroxydiphenyl-2,2-propane | Alcohols, dilute alkali. |
| Benzil | Methanol, ethyl alcohol, ether, chloroform, ethyl acetate, benzene, nitrobenzene, toluene, hexane. |
| Ethylene carbonate | Water, alcohols, glacial acetic acid, benzene, chloroform, ethyl acetate, aqueous ethers. |
| 2-chloronaphthalene | Ethyl alcohol, quinoline. |
| Hexachlorobenzene | Benzene, chloroform, carbon disulphide, xylene. |
| 2,2-methylene-bis-(3,4,6-trichlorophenol) | Ethyl alcohol, acetone, dilute alkali. |
| Hexachlorocyclohexan | Ethyl alcohol, chloroform, benzene, xylene, trichloroethylene, tetrachloroethylene, carbon tetrachloride, carbon disulphide. |
| Hexachloroethane | Ethyl alcohol, ethyl ether, chloroform, carbon tetrachloride, benzene. |
| Diphenyloxide | Ethyl alcohol, ethyl ether. |
| N-cyclohexyl succinimide | Dimethyl formamide, tetramethyl urea. |

The process for the production of pure polymer powders described above enables polymer powders of any desired fineness to be obtained, which according to their fineness are suitable in many fields of applications.

The new polymer powders according to the method of their preparation are highly porous and in general have a surface area of more than 5 m.²/g. In particular surface areas of 20 to 100 m.²/g. or more can be readily achieved. Coarser polymer powders are used for coatings by sintering techniques, e.g. in rotary or whirl sintering processes, finer powder grades for electostatic coating methods on solid metallic glass and ceramic surfaces. The coated object is heat-treated thereafter, whereby the applied powder fuses or sinters and forms a thermoplastic highly heat and electricity insulating anticorrosive coating on the surface of the coated object. The mechanical properties of the polymeric films are excellent, e.g. the hardness determined by the pendulum impact test by König with the pendulum apparatus, the cupping test on coating by Erichsen (DIN 53 156) and the cross-cut adhesion tests show excellent mechanical properties.

It is evident from the preceding disclosure that the polymer powders need not be totally free from the solid solvent. On the contrary the solid solvent plastifies the film thus improving its adhesion and flexibility if the coated object is deformed under load. The new polymer powders in view of their high fineness are useful for producing extremely thin coatings, or of liquid dispersions in the varnish coating technique, especially in the coil coating technique.

The new polymer powders are further useful in the cosmetic industry as base of toilet powders. The high porosity of the new powders permits their applications as filter media adsorbentia, as substrates of aerosols, liquid explosives, herbicides, insecticides, pesticides or catalysts, as packing material with high absorption capacity or as moulding powders. The following Examples illustrate the invention without limiting its scope.

All polymers comminuted into fine porous particles of a particle size below 500μ and of a surface area of a least 5 m.²/g. in accordance with the method of this invention can be converted by a powder coating technique into protective anticorrosive surface coatings on metal hardware of which power of resistance against chemical attack, mechanical damage and fissure is distinctly improved.

The following Examples illustrate the invention without limiting its scope.

Example 1

In a reaction vessel fitted with stirrer, condenser, thermometer and gas inlet tube 75 parts of technically pure, anhydrous naphthalene are melted and heated to 140–150° C. 25 parts of thoroughly dried polyethylene terephthalate granules of cylindrical shape and 2–3 mm. length, of 0.74 dl./g. intrinsic viscosity measured with a solution of 1 g. polymer in 100 grams of phenol/tetrachlorethane 1:1 at 30° C. and melting point ∼260° C. are added. The temperature of the melt is increased to 200° C. to 220° C. in a nitrogen atmosphere with stirring, on which the polyester dissolves smoothly in the space of 30–60 minutes to give a homogeneous, slightly turbid melt. The melt is run out into a receiver, on which it solidifies.

The crushed product is ground in a hammer mill and a size fraction of <500 microns screened off. This fraction is ground further in a pin disk mill to a particle size range of less than 315 or 200 microns, depending on the number of revolutions per unit of time and the powder grinding capacity of the machine. The resulting powder is freed from naphthalene by ether extraction in a Soxhlet apparatus and dried. The intrinsic viscosity of the final polyester powder is 0.70–0.73 dl./g.

Replacing polyethylene terephthalate by the following thermopalstic polymers, the naphthalene by the following solid solvents, the ether by the following extracting liquids and using similar procedures similarly finely divided powder of the corresponding polymer is obtained.

| Thermoplastic polymer | Solid solvent |
|---|---|
| Copolyester (100 mol percent terephthalic acid, 95 mol percent ethylene glycol, 5 mol percent bis-phenol-A-diglycol ether). Intrinsic viscosity 0.89 dl./g. (a). | Naphthalene. |
| Low density polyethylene, relative viscosity 3.30 in a 1 percent xylene solution at 30° C.) (b). | Diphenyl. |
| Polyvinylchloride (relative viscosity 2.45 in a 1 percent tetrahydrofurane solution at 30° C.) (c). | Benzophenone. |
| Polystyrene (relative viscosity 2.20 in a 1 percent toluene solution at 30° C.) (d). | ε-Caprolactame. |
| Polycarbonate of phosgene and 4,4'-dihydroxy-diphenyl-2,2-propane (relative viscosity 1.80 in a 1 percent methylene chloride solution at 30° C.) (e). | β-Naphthol. |

| Extracting liquid | Ultimate utility |
|---|---|
| (a) Ether | Anticorrosive protective coating of metallic surfaces. |
| (b) Ether | Impregnating coating for fabrics. |
| (c) Methanol | Weather resistant protective coating of metallic surfaces. |
| (d) Water | Soil improving powders; moulding powder. |
| (e) Diisopropylether | Polycellular filter material, e.g. cigarette filters. |

Example 2

In a kneading machine with oil circulation heating 75 parts of anhydrous fibre-grade dimethyl terephthalate are melted and heated to 150–160° C. 25 parts of thoroughly dried polyethylene terephthalate fibre waste, 10–22 mm. in length, of 0.93 dl./g. intrinsic viscosity in phenol/tetrachlorethane 1:1 at 30° C. and melting point 260° C. are added. The temperature is increased to 170–180° C. which causes the polymer material to go into solution. Dissolving takes 20 minutes and proceeds best in a nitrogen atmosphere. It results in a homogeneous, slightly turbid melt which is discharged into a receiver where it solidifies. On cooling to room temperature the product is submitted to preliminary grinding, after which it is ground in a pin disk mill at 14,000 r.p.m. to a powder with the particle size range noted below; the values were determined with standard test screens in accordance with German Industrial Standard 4188.

| Width of screen mesh in microns: | Throughput in percent |
|---|---|
| 125 | 99.7 |
| 90 | 92.0 |
| 40 | 51.7 |

Of this powder, three samples with the particle size (a) >90 microns <125 microns
(b) >40 microns <90 microns
(c) <40 microns are extracted with chloroform in the Soxhlet. The resulting powders are air dried. Their intrinsic viscosities are (a) 0.88
(b) 0.92 and
(c) 0.89 dl./g.

The powder with a particle size below 40 microns grades as a base for a cosmetic powder with a smooth feel.

Example 3

In a ground flask fitted with stirrer, condenser, thermometer and gas inlet tube, 90 parts of anhydrous ε-caprolactam (fibregrade quality) are melted and heated to about 140–150° C. 10 parts of a copolyester (100 mol.- percent terephthalic acid, 95 mol.-percent ethylene glycol and 5 mol.-percent bis-phenol-A-diglycolether as cocomponents), with granule sizes to 1000 microns, an intrinsic viscosity of 0.67 dl./g. and melting point 243° C., are added to the melt. The temperature is raised to 160–170° C. with stirring in a nitrogen atmosphere. After about 20 minutes a homogeneous melt is formed which is unloaded from the vessel and allowed to cool to room temperature. The product is crushed and then ground in a pin disk mill at 14,000 r.p.m. to a powder with the following particle size range, measured with test screens as specified in German Industrial Standard 4188;

| Width of screen mesh in microns: | Throughput in percent |
|---|---|
| 125 | 91.6 |
| 90 | 85.0 |
| 40 | 73.4 |

A size fraction of <40 microns and a second fraction obtained by screening in an air-jet sieve, which has a microscopically determined particle size of <10 microns, are freed from ε-caprolactam, by dispersion and three washes with equal parts by weight of hot water and then by dispersion and washing two times in five times the amount of cold water. The residual ε-caprolactam is extracted in the Soxhlet with methanol or ethanol. The polyester powders thus obtained have intrinsic viscosities of 0.65 dl./g. (<40 microns) to 0.67 dl./g. (<10 microns). The coarser polyester powder is electrostatically applied on the exterior of metallic pipes and sintered thereon where it forms an anticorrosive scratch resistant coating. Such pipes can be fitted or layed underground for pipelines.

Example 4

100 parts of anhydrous ε-caprolactam (fibre-grade quality) are melted and heated to 140° C. in a reaction vessel equipped with a stirrer, condenser, thermometer and gas inlet pipe. 50 parts of a copolyester from 95 mol.-percent terephthalic acid and 95 mol.-percent ethylene glycol, with 5 mol.-percent bis-phenol-A-diglycolether and 5 mol.-percent isophthalic acid as cocomponents, are added to the melt. Prior to addition the copolyester is ground to a particle size range of >500 to <1,000 microns, pigmented and treated with 0.7 percent by weight of a levelling agent ["Modaflow" polyacrylate of Monsanto]; its intrinsic viscosity is 0.75 dl./g. and its melting point is 226° C. The melt is heated with stirring to about 170–175° C. in an inert gas atmosphere. After 20 minutes the solution formed, which is of 31 weight percent relative to the copolyester, is run into a receiver to solidify and cool to room temperature. It is pre-ground and afterwards ground further in a pin disk mill at 11,200 r.p.m. and 25–30 kg./hour throughput. Screen analysis shows the powder to have an approximately 90% size fraction of <125 microns and a fraction greater than 80% of 40–90 microns. The <125 micron fraction is extracted in a Soxhlet with methanol as solvent, and then dried. The intrinsic viscosity of the resulting powder, after the correction required by the additives present, is 0.73 dl./g. This powder is highly suitable for coating purposes.

Applied by means of an electrostatic powder spraying apparatus to test metal sheet (150 x 70 x 1 mm.) with melting in a vacuum drying oven, it gives a homogeneous film with excellent mechanical properties.

Example 5

The dissolving stage of the process is carried out as in Example 4 with the same copolyester, solvent and additives, except that the pigment concentration is lower. After the 26.6 weight percent solution has cooled to room temperature it is ground in a pin disk mill at 9,000 r.p.m.

Screen analysis shows the particle size distribution to be:

| | Percent |
|---|---|
| 125 to 250 microns | 25 |
| 90 to 125 microns | 25 |
| 40 to 90 microns | 43 |
| <40 microns | 6 |

The polyester powder obtained after extraction of ε-caprolactam with methanol and drying has an intrinsic viscosity of 0.74 dl./g. and is very suitable for coating by the whirl sintering process. The films of a thickness between 200 to 400 microns are suitable for scratch resistant accessories in the vehicle industry.

Example 6

In a kneading machine fitted with oil circulation heating technically pure, anhydrous naphthalene is melted and the temperature raised to 140–150° C. Into the melt are entered 40 parts of a copolyester mixture of 80 weight percent of a linear copolyester and cocomponents as in Example 4, which has been pigmented in the mass with 10 weight percent of titanium dioxide, set with 0.5 weight percent of "Modaflow" polyacrylate (Monsanto), comminuted to a particle size range of >500 to <1000 microns, and has an intrinsic viscosity of 0.59 dl./g. It is followed by 20 weight percent of a copolyester of the same chemical composition but of 0.22 dl./g. intrinsic viscosity. The temperature is raised to 170–180° C. and the melt kneaded for 20 minutes. The homogeneous melt which has a total polyester content of about 26.5 percent is run into a receiver to solidify and cool. It is then ground in a pin disk mill at 14,000 r.p.m., and the resulting powder freed from naphthalene by sublimation in a whirl type machine with the aid of a water-jet pump at 50–70° C. The final powder has an intrinsic viscosity of 0.52 dl./g. as compared with 0.53 dl./g. for the average viscosity calculated for the starting mixture, and a size fraction of <125 microns of about 90 percent. It is applied to metal test sheet with an electrostatic spraying device and melted in a drying oven to give a homogeneous film with excellent hardness.

Example 7

The dissolving process and the production of the copolyester mixture are carried out analogously to Example 6. The solid cooled solution is of 27.5 percent concentration relative to the copolyester owing to the lower pigment concentration. It is ground in a pin disk mill at 7,100 r.p.m. Screen analysis gives the following values for the particle size distribution:

| | Percent |
|---|---|
| >250 to <315 microns | 22 |
| >125 to <250 microns | 32 |
| >90 to <125 microns | 22 |
| >40 to <90 microns | 24 |
| <40 microns | 1.0 |

The powder is freed from solid solvent as in Example 6. The final powder, which has a corrected intrinsic viscosity of 0.51 dl./g., is very suitable for coating by the whirl sintering process. The films obtained on bicycle mudguards are hard and scratch resistant.

Example 8

100 parts of a dimethyl terephthalate ground to a particle size of <20 microns and 12.5 parts of titanium dioxide are mixed in the dry state. The mixture is melted in a reaction vessel by heating for 30–40 minutes at 150° C. with stirring. 50 parts of copolyester (cocomponents as in Example 4) granules of cylindrical shape and 2–3 mm. in length, of 0.75 dl./g. intrinsic viscosity and about 225° C.

melting point are added. The temperature is increased to about 190–200° C. After stirring for 40 minutes in an inert gas atmosphere a homogeneous melt is obtained. It is unloaded from the vessel, on which it solidifies, and after cooling to room temperature is preground and then ground further in a pin disk mill of the Alpine Augsburg Kolloplex 160 Z type at 14,000 r.p.m. and a throughput of 35–40 kg./hour. The solvent is extracted with chloroform and the powder dried. The corrected intrinsic viscosity of the powder is 0.74 dl./g. and the particle size distribution is

| | Percent |
|---|---|
| >125 to <250 microns | 25 |
| >90 to <125 microns | 26 |
| >40 to <90 microns | 33 |
| <40 microns | 16 |

It is suitable for coating by the whirl sintering process. The films obtained on metallic surfaces of vehicle parts are hard as well as flexible and show high adhesive strength.

Examples 9 to 22 General Process (to Table 3)

The solid anhydrous solvent is heated to a temperature above its melting point and 10 weight percent of solid polymer is added to the melt. The polymer is dissolved with stirring in an inert gas atmosphere and the homogeneous melt unloaded to solidify and cool. It is comminuted and ground further to a powder with a particle size range below 500 microns. The solid solvent in general is finally removed by a physical separation method.

The examples in Table 3 were carried out with variation of the solid solvent and with a copolyester (I) consisting of 100 mol.-percent terephthalic acid, 95 mol.-percent of ethylene glycol with 5 mol.-percent bis-phenol-A-diglycolether, which has an intrinsic viscosity of 0.96 dl./g. and melting point 243° C., and a copolyester (II) from 95 mol.-percent terephthalic acid and 95 mol.-percent ethylene glycol with 5 mol.-percent bis-phenol-A-diglycolether and 5 mol.-percent isophthalic acid as cocomponents, which has an intrinsic viscosity of 0.75 dl./g. and a melting point of 226° C. The concentration is 10 weight percent polymer throughout.

TABLE 3

| Ex. | Dissolving method Solvent | Polymer | Dissolving temperature, °C. | Pulverized polymer solution particle size (microns) |
|---|---|---|---|---|
| 9 | Dimethyl iso-phthalate | I | 180–190 | >40<90 |
| 10 | N'N-dimethyl urea | I | 170–190 | <315 |
| 11 | β-Naphthol | I | 140–160 | >315<500 |
| 12 | Camphor | I | 190–200 | <500 |
| 13 | Benzophenone | II | 130–140 | <125 |
| 14 | Benzil | I | 160–170 | <315 |
| 15 | 2-ethyl-anthraquinone | II | 190–200 | <500 |
| 16 | α-Naphthol | I | 150–160 | <315 |
| 17 | Acenaphthene | II | 160–170 | <125 |
| 18 | Diphenyl | II | 170–180 | <500 |
| 19 | 4-hydroxydiphenyl | I | 170–180 | <315 |
| 20 | p-Dichlorobenzene | I | 160–180 | <500 |
| 21 | Resorcinol | II | 150–160 | <125 |
| 22 | 4-chlorophenol | II | 140–160 | <500 |

| Ex. | Solvent separation Separation method | Solvent or separating agent | Polymer powder [η] [dl./g.]¹ | Particle size |
|---|---|---|---|---|
| 9 | Extraction | CHCl₃ | 0.98 | <90 |
| 10 | Centrifuging | Hot water | 0.95 | <315 |
| 11 | Extraction | Ether | 0.99 | <500 |
| 12 | Sublimation | Vacuum | 0.99 | <500 |
| 13 | Extraction | Ether | 0.75 | <125 |
| 14 | do | do | 0.93 | <315 |
| 15 | Vacuum sublimation, extraction | Benzene | 0.71 | <500 |
| 16 | Extraction | Ether | 0.99 | <315 |
| 17 | do | Diisopropyl ether | 0.76 | <125 |
| 18 | do | Ether | 0.75 | <500 |
| 19 | do | Ethanol | 0.90 | <315 |
| 20 | do | Benzene | 0.94 | <500 |

¹ Measured in phenol/tetrachlorethane 1:1 at 30° C.

In addition, pulverized copolyester solutions (-dispersions) and from them copolyester powders of <500 microns particle size have been prepared by a similar procedure using the following solvents: bis-phenol-A, naphthalene-2,6-dicarboxylic acid methylester, 9,10-dihydroanthracene.

The powdery polymer containing solution 12 grades as a deodorant composition. The powdery polymer containing solutions 16, 21 and 22 can be used as adhesive powders in bonding together two or more Mylar films and in the production of plastic composites. The pure porous polymer powders 9, 10, 11, 13, 14, 15, 17, 18, 19 and 20 are applied on metallic objects by means of the electrostatic powder coating technique (9) or in a whirl sinter process (10, 11, 13 to 15, 17 to 20) and intered above their respective melting points. The films obtained show excellent mechanical properties and are highly resistant against chemical attack.

Example 23

90 parts of a eutectic mixture of 61 mol.-percent naphthalene and 39 mol.-percent α-naphthol, melting point 61.5° C., are melted in a reaction vessel fitted with a stirrer, condenser, thermometer and gas inlet pipe, and the melt raised to about 100° C. 10 parts of a size fraction 7500 to <1000 microns of the copolyester II (see Examples 13 and 15 in Table 1, [η]~0.75 dl./g., melting point $T_F$~226° C.) are added and dissolved in 15–20 minutes at 130°–140° C. The dissolving operation is carried out in an inert gas atmosphere with stirring. The melt is unloaded as a thin cake. After solidification, cooling and preliminary grinding it is ground in a pin disk mill at 14,000 r.p.m. The resulting powder has a size fraction of <125 microns of about 95 percent. After extraction of the solvent with ether its intrinsic viscosity is 0.72 dl./g.

Example 24

10 parts of the comminuted copolyester II (see Examples 13 and 15 in Table 3) are dissolved in 90 parts of a mixture of naphthalene (78 mol.-percent) and camphor (22 mol.-percent) at 150–160° C. The cooled mass is ground in a mortar and the solvent extracted with ether. The pure copolyester powder has an intrinsic viscosity of 0.76 dl./g. and a particle size of <315 microns.

Example 25

20 parts of the previously comminuted copolyester II (see Examples 13 and 15 in Table 3) are dissolved in 80 parts of a mixture of 80 mol.-percent dimethyl terephthalate and 20 mol-percent dimethyl isophthalate at 180°–190° C. The cooled mass is pulverized and extracted with chloroform. The pure copolyester powder has an intrinsic viscosity of 0.73 dl./g. and a particle size range of <200 microns.

Example 26

3 parts of the previously comminuted copolyester I (see Examples 9, 10, 11, 12, 14, 16, 19, 20 of Table 3) are dissolved in 97 parts of an eutectoid mixtures of 62 parts naphthalene and 38 parts hexachloroethane (M.P. 57° C.) at 160–180° C. The transparent melt is cooled and pulverized in a pin disk mill and extracted with ether. The pure copolyester powder has an intrinsic viscosity of 1.02 dl./g. and a particle size range of <250 microns.

Examples 27 to 51 (see Table 4)

The solid anhydrous solvent is heated to above its melting point and 3–10 weight percent of the solid polymer are added to the melt. The polymer is dissolved in an inert gas atmosphere with stirring and the homogeneous melt unloaded as thin cake. After cooling, it is pre-ground and then ground further to a powder with a particle size range below <315 microns. Finally the solid solvent is removed by a physical separation method.

TABLE 4

| Example | Ultimate Utility of pure polymer powders | Wt. percent polymer | $\eta_{rel}$ 1%, 30° C. | Dissolving method Solvent | Dissolving temperature, °C. | Polymer solution particle size, microns | Separating method | Applied liquid solvent or separating agent | $\eta_{rel}$ 1%, 30° C. | Particle size microns |
|---|---|---|---|---|---|---|---|---|---|---|
| 27, 28, 29, 39, 51 | Anticorrosive surface coatings of metallic garden and camping furniture. | 3% Polyamide 11 | 2.03 (HCOOH) | N,N'-dimethyl urea | 170–190 | <315 | Extraction | Ether | 1.96 (HCOOH) | <315 |
| 28 | | do | 2.03 (HCOOH) | Naphthalene | 180–190 | <200 | do | do | 2.04 (HCOOH) | <200 |
| 29 | | do | 2.03 (HCOOH) | Dimethylterephthalate | 180–190 | <200 | do | CHCl₃ | 1.97 (HCOOH) | <200 |
| 30, 31 | Chemical resistant protective coatings for hardware. | 5% polypivalolactone | 5.46 (phenol/o-Cl-phenol 6:4) | ε-Caprolactam | 180–190 | <315 | Centrifuging | H₂O | 5.29 (phenol/o-Cl-phenol 6:4) | <315 |
| 31 | | do | do | Dimethylterephthalate | 170–180 | <315 | Extraction | CH₃OH | 5.11 (phenol/o-Cl-phenol 6:4) | <315 |
| 32, 33, 40 | Filter media. | 10% polycarbonate¹ | 1.80 (CH₂Cl₂) | Naphthalene | 120–130 | <315 | do | Ether | 1.75 (CH₂Cl₂) | <315 |
| 33 | | do | do | ε-Caprolactam | 160–170 | <315 | Centrifuging | H₂O | 1.78 (CH₂Cl₂) | <125 |
| 34, 41 | Electroinsulating protective coatings. | 10% poly-p-phenylene | 1.72 (toluene) | do | 150–160 | <315 | Centrifuging Extraction | CH₃OH | 1.73 (toluene) | <315 |
| 35, 36 | Soil improving powders. | 5% polystyrene | 1.80 (toluene) | do | 150–160 | <315 | Centrifuging Extraction | H₂O CH₃OH | 1.81 (toluene) | <315 |
| 36 | | do | do | Naphthalene | 150–160 | <200 | Sublimation | Vacuum | 1.79 (toluene) | <200 |
| 37, 42 | Transparent moulded articles. | 10% polymethacrylate | 1.65 (HCOOH) | ε-Caprolactam | 110–120 | <315 | Centrifuging | H₂O | 1.68 (HCOOH) | <315 |
| 38 | | 5% low density polyethylene. | 3.30 (xylene) | Naphthalene | 120 | <315 | Extraction | Ether | 3.35 (xylene) | <315 |
| 39 | | 3% polyamide 11 | 2.03 (HCOOH) | 4-Chlorophenol | 80–150 | <315 | do | do | 1.99 (HCOOH) | <315 |
| 40 | | 10% polycarbonate² | 1.80 (CH₂Cl₂) | β-Naphthol | 150–160 | <250 | do | do | 1.79 | <250 |
| 41 | | 3% poly-p-phenylene oxide. | 1.72 (toluene) | p-Dichlorobenzene | 140–150 | <315 | do | Ethanol | 1.74 | <315 |
| 42 | | 10% polymethacrylate | 1.65 (HCOOH) | α-Naphthol | 130–140 | <200 | do | Ether | 1.62 (HCOOH) | <200 |
| 43, 44 | Cosmetic base material with smooth feel. | 10% polytetramethylene | 2.48 (phenol: tetrachloroethane 1:1) | Naphthalene | 140–160 | <40 | do | di-isopropyl ether. | 2.39 (phenol: tetrachloroethane 1:1). | <40 |
| 44 | | 5% polytetramethylene terephthalate. | 2.48 (see 43) | ε-Caprolactam | 160–170 | <40 | Centrifuging | H₂O CH₃OH | 2.36 (see 43) | <40 |
| 45 | Polycellular articles (filter media). | 7.5% polytetramethylene terephthalate | do | Dimethylterephthalate | 160–170 | <315 | Extraction | CH₃OH | 2.41 (see 43) | <315 |
| 46, 47, 48, 49, 50 | Hollow articles (bottles), highly weather resistant wire coatings. | 8% polyvinylchloride | 2.45 (tetrahydrofurane) | Dimethylisophthalate | 90–100 | <315 | do | CH₃OH | 2.39 (tetrahydrofurane) | <315 |
| 47 | | 5% polyvinylchloride | 2.45 (see 46) | ε-Caprolactam | 80–90 | <315 | Centrifuging | H₂O | 2.41 (tetrahydrofurane) | <315 |
| 48 | | 10% polyvinylchloride | do | Benzophenone | 80–90 | <200 | Extraction | CH₃OH | 2.48 (tetrahydrofurane) | <200 |
| 49 | | 7.5% polyvinylchloride | do | Naphthalene | 100–110 | <125 | do | Ether | 2.43 (see 46) | <125 |
| 50 | | 3% polyamide 11 | do | Diphenylcarbonate | 100–110 | <315 | do | do | 2.35 (see 46) | <315 |
| 51 | Hollow articles (bottles) by rotation sintering. | 3% polyamide 11 | 2.03 (HCOOH) | Benzoic acid phenylester | 160–170 | <315 | do | Ethanol and ether. | 1.93 (HCOOH) | <315 |

¹ Polycarboxylic acid ester of 4,4'-dihydroxydiphenyl-2,2-propane.

Example 52

50 parts of naphthalene are melted and the melt heated to 140–150° C. 50 parts of a mixture of 95 percent by weight of a copolyester II (see Examples 13 and 15 in Table 3), pigmented with 15 weight percent of titanium dioxide and ground to a particle size range of <1000 microns, and 5 weight percent of an unpigmented polyamide 11 as 2-3 mm. long cylindrical granules, $\eta_{rel}$ 2.03 in formic acid at 30° C., are added to the melt. The temperature is increased to 170–190° C. with stirring in an inert gas atmosphere. Within about 40 minutes a homogeneous melt is formed which is unloaded as thin cake. After cooling and preliminary grinding it is ground in a pin disk mill at 14,000 r.p.m. The size fraction <125 microns (about 85 percent) of the powder is screened off, electrostatically sprayed on test metal sheet (150 × 70 × 1 mm.) with a powder spraying apparatus and melted for 10 minutes at 250° C. in a drying oven. A flexible film free from pores is obtained.

Example 53

50 parts of dimethyl terephthalate are melted at 150° C. 50 parts of a mixture of 90 percent by weight of a copolyester II (see Examples 13 and 15 in Table 3), pigmented with 15 percent by weight of titanium dioxide and ground to a particle size range of <1000 microns, and 10 percent by weight of an unpigmented polycaprolactone as 2-3 mm. long granules are added to the melt. The temperature is increased to 190–200° C. in an inert gas atmosphere with stirring. After about 40 minutes a homogeneous melt is obtained, which is unloaded, allowed to cool and ground. It is ground further in a pin disk mill at 14,000 r.p.m. The size fraction <125 microns (about 90 percent) of the powder is sprayed with an electrostatic powder spraying apparatus on test metal sheet.

(a) without prior separation of the dimethyl terephthalate,
(b) after partial separation of the dimethyl terephthalate,
(c) after complete separation of the dimethyl terephthalate.

After melting in a drying oven a smooth film free from pores is obtained in all three cases.

Example 54

95 parts of N-methylphthalimide are melted at 150° C. 5 parts of a polyethylene terephthalate fiber waste, having an intrinsic viscosity of 0.75 dl./g., are added to the melt. The temperature of the mixture is raised to 170–180° C. and held at this temperature for 15 to 20 minutes. The homogeneous almost transparent melt is unloaded, allowed to cool and ground in a pin disk mill. The resulting powder, having a particle size range <125, is extracted with ethanol in a Soxhlet extractor. The solvent-free dry powder has an intrinsic viscosity of 0.69 dl./g., having a surface area of 67 to 69 m.$^2$/g. and is worked into a tobacco smoke filter according to the procedure described in British Pat. No. 1,172,317. The tobacco filter element obtained is attached to a cigarette and shows a high tar removal capability.

Example 55

400 parts of polyethylene terephthalate, having an intrinsic viscosity of 0.68 dl./g. are dissolved in 700 parts of naphthalene at 200 to 210° C. The solidified melt is ground to a particle size below 400 microns in an pin disk mill at a grinding capacity of 25 kg./hour, at 14,000 r.p.m. The naphthalene of the ground polymer dispersion is removed by water steam distillation. The pure polymer having an intrinsic viscosity of 0.63 dl./g., is screened with test sieves according to the procedure disclosed in German DIN 4188 and shows the following particle size distribution, compared with conventional ground polyethylene terephthalate (having the same intrinsic viscosity, cylinder granulate of 3–5 mm. length and of 2 mm. radius). The conventional grinding conditions are: polymer cooled 1 hour with liquid nitrogen cooling, grinding capacity 8 to 10 kg./hour and 14,000 r.p.m.

| Sieve (width of mesh) | Residue on sieve (percent by weight) | |
|---|---|---|
| | New method | Conventional method |
| 315 | 0.56 | 35.2 |
| 250 | 0.81 | 10.4 |
| 200 | 4.12 | |
| 125 | 16.70 | 41.2 |
| 90 | 14.30 | 5.0 |
| 71 | 11.80 | |
| 40 | 34.00 | 5.9 |
| <40 | 17.60 | [1] 2.2 |

[1] Throughput.

The unfractionated conventionally ground polyethylene terephthalate powder has a surface area of 0.1 m.$^2$/g., whereas the polyethylene terephthalate powder obtained following the new method has a surface area of 73 m.$^2$/g.

The polyethylene terephthalate powder with the high surface area is worked into a tobacco smoke filter with excellent tar removal capability.

Example 56

Polyethylene terephthalate powder fractions obtained according to the new method show the following surface area—powder fraction—relationship:

Fraction (microns):                Surface area (m.$^2$/g.)
>125<250 _____ 23
>90<125 _____ 33
>71<90 _____ 42
>40<71 _____ 50
<40 _____ 62

Conventionally ground polyethylene terephthalate powders, having a particle size range below 40μ, have at most a surface area of 0.3 m.$^2$/g.

Examples 57 to 59

10 parts of polyethylene terephthalates of high intrinsic viscosity values are dissolved in 90 parts of a solid solvent. The cooled mass is pulverized and the solid solvent is removed by a physical method.

| Intrinsic viscosity [1] | Solid solvent | Dissolving temperature | Solvent separation | Polymer powder particle size |
|---|---|---|---|---|
| 1.18 | Benzophenone | 180–190 | Extraction | <315 |
| 1.23 | Naphthalene | 190–210 | Water steam distillation. | <315 |
| 1.23 | Benzophenone | 190–200 | Extraction | <500 |

[1] Phenol: tetrachloroethene 1:1 at 30° C.

The decomposition of the polyesters amounts less than 10 percent in each case.

Example 60

600 parts naphthalene and 600 parts of a copolyester having an intrinsic viscosity of 0.72 dl./g. (consisting of 80 mol.-percent terephthalic and 20 mol.-percent isophthalic acid residues, 92.5 mol.-percent ethylene glycol and 7.5 mol.-percent bis-phenol-A-diglycolether residues), pigmented with 15 percent by weight of $TiO_2$ in relation to the amount of copolyester, are mixed 30 to 40 minutes at 170–190° C. until a homogeneous melt is formed. The cooled and solidified melt is ground to a particle size below 125μ.

600 parts of the polymer containing powder were (a) extracted with ether and applied by an electrostatic powder coating apparatus on test metal sheets (150 x 70 x 1 mm.) and sintered 5 to 8 minutes in a drying oven at 230° to 250° C.

600 parts of the polymer containing powder were (b) applied directly without solvent separation by an electrostatic powder coating apparatus on the same test metal sheets and sintered 5 to 8 minutes in a drying oven at 230° to 250° C.

The films (a) and (b) show nearly the same mechanical properties which is evident from inspection into the following table, whereas the surface level of the film (b) is appreciably better and shows no pores and craters.

| Film thickness (μ) | Mechanical property | | |
|---|---|---|---|
| | Cross cut test DIN 53151 | Hardness DIN 53157 (sec.) | Cupping test DIN 53156 (mm.) |
| (a) 80–120 | GT 0 | 200–210 | >9 |
| (b) 80–140 | GT 0 | 180–200 | >9 |

Note.—The films (b) have a naphthalene content below 1.5 percent by weight.

Example 61

900 parts dimethyl terephthalates and 600 parts of the pigmented copolyester of Example 60 are mixed 30 to 40 minutes at 190–200° C. until a homogeneous melt is formed. The cooled and solidified melt is ground to a particles size below 125μ.

750 parts of the polymer containing powder are
(a) extracted with methanol and applied by an electrostatic powder coating apparatus on test metal sheets and sintered 5 to 8 minutes in a drying oven at 230–260° C.

750 parts of the polymer containing powder are
(b) applied directly without solvent separation by an electrostatic powder coating apparatus on metal test sheets and sintered 5 to 8 minutes in a drying oven at 230–250° C.

The films (a) and (b) show the same results in the cross cut test and in the cupping test as the films obtained following Example 60.

Films Thickness [μ]:                  Hardness [sec.]
   (a) 80–140 _____ 200–210
   (b) 35–80 _____ 200–240

The surface level of (b) shows no homogenities. From this Example it is evident, that the direct application saves material costs and permits higher material economy.

Example 62

50 parts polytetramethylene terephthalate having a relative viscosity (1 percent solution in phenol:tetrachlorethane at 30° C.) of 1.55 and 50 parts 2,2'-methylene-bis-(3,4,6-trichlorophenol), 2–5 parts of camphor and 5 to 10 parts talcum powder are mixed at 180 to 200° C. until a homogeneous melt is formed. The melt is cooled, crushed and comminuted to a powder with a particle size range below 40 micron. The powder composition obtained serves as an excellent powder base for cosmetic powders, compact powders, soap powders, if it is incorporated in the final powder in such amounts that its content of 2,2-methylene-bis-(3,4,6 - trichlorophenol) ranges between 1 and 5 percent by weight of the final powder. The final powder obtained is distinguished over conventional powders by its enduring antiseptic efficiency without skin irritation.

Finer powders of the same chemical composition can be used as powder bases for aerosols with high bacteriocide and antiseptic efficiency.

Example 63

40 parts of polymethylmethacrylate and 60 parts of p-chloromethacresol are mixed at 140° to 160° C. until a homogeneous melt is formed. The solidified melt is ground to a powder composition of particle size range below 125 microns.

This composition is used as a base of preservatives for inks, woods, leather and paper with enduring preserving efficiency. The composition further serves as a base for dispersion paints or impregnating agents.

Instead of p-chlorometacresol, p-chloro-m-xylenol or other solid chlorocresols also can be used; polymethylmethacrylate can be replaced by polyester waste, polyvinylacetate and polyvinylbutyral.

Example 64

In a 4 l. flask equipped with a 2 l. Soxhlet extractor with a filter shell (75 x 250 mm. Schleicher & Schüll filter paper No. 603) and an intensive running water condenser, 2.5 l. of ether is placed and is heated with an electrical heating jacket until it boils gently. The extraction shell is filled as far as 2 to 5 cm. of its rim with a powder having a particle size of below 200 microns consisting of 70 percent by weight of naphthalene and 30 percent by weight of polyethylene terephthalate of an intrinsic viscosity of 0.67 dl./g. The ether vapour condenses and runs down in the Soxhlet extractor where it dissolves the naphthalene. The Soxhlet extractor when filled with ether is emptied by a siphon. The ether distils, condenses again and refills the Soxhlet extractor. The level of the powder in the extraction shell falls as the extraction proceeds and new powder can be added. After an extraction time of 8 to 12 hours without additional powder supply the polyethylene terephthalate powder is air-dried and screened. The loose agglomerates obtained fall to powder during the screening operation. A polyester powder is obtained with a particle size of below 200 microns which contains only traces of naphthalene.

The naphthalene can be easily separated from the ether solution and used again.

Example 65

In a 6 l. ground flask with 6 peripher rib-like indentations (to prevent sintering of the powder) are placed 800 grams of a previously comminuted powder, consisting of 90 parts by weight of naphthalene and 10 parts by weight of polycarbonate (Makrolon, relative viscosity 1.80, measured with a 1 percent solution of the polymer in phenol-tetrachlorethane 1:1 at 30° C.). The flask is rotated with 60 to 80 r.p.m. and evacuated with a vacuum oil pump. The inclined flask rotates in a iron sheet housing which is maintained at 50° to 65° C. Between flask and vacuum pump three one-liter cooling traps are placed. The trap nearest to the vacuum pump is cooled with liquid nitrogen cooling, whereas the middle trap is cooled applying running water cooling. Sublimation is finished, if no naphthalene or only traces of naphthalene passes over into the traps.

The regained naphthalene is particularly pure and can be used without further purification step.

The polycarbonate powder containing at the maximum 1 to 3 percent by weight of naphthalene is screened through a 500 microns screen and nearly all of the powder passes the screen.

Example 66

In a 2 neck ground flask equipped with a dephlegmator, a descending running water condenser and a gas inlet tube 2 l. of a water dispersion of 500 g. of a powder having a particle size of below 125 microns consisting of 60 parts by weight of naphthalene and 40 parts by weight of polyethylene terephthalate of an intrinsic viscosity of 0.65 dl./g. is poured. From a 5 l. metal vessel equipped with a glass overflow pipe water vapor is conducted through the heated ground flask and the naphthalene is driven over. To avoid blocking of the condenser the running water is turned off from time to time. The water vapor distillation is carried on until no or merely traces of naphthalene pass over. This takes at least 4 to 6 hours. The clotted naphthalene can be easily removed from the water, dried on used again. The polyethylene terephthalate powder is filtered off, washed with ether and air dried. It has a particle size of below 125 microns and a naphthalene content of approximately 1 to 3 percent by weight.

What I claim is:

1. Solid theromplastic-polymer-containing particles having a particle range below 500 microns, each particle of which comprising uniformly dispersed therein (a) 100 parts by weight of naphthalene and
    (b) at least 1 and at most 100 parts by weight, not exceeding saturation concentration in (a), of a thermoplastic polycarbonate or polylactone polymer which is solid at 25° C., the naphthalene being a solvent for the polymer with a dissolving power of at least 1 part by weight of the polymer per 100 parts by weight of the solvent, the solvent being chemically stable in relation to said polymer at a temperature above the melting point of said solvent at which the polymer is soluble in the solvent.

2. Solid thermoplastic-polymer-containing particles having a particle range below 500 microns, each particle of which comprises uniformly dispersed therein (a) 100 parts by weight of naphthalene and
    (b) at least one and at most 100 parts by weight, not exceeding saturation concentration in (a), of a thermoplastic condensation polymer which is solid at 25° C. and is a member selected from the group consisting of polyethylene terephthalate, polyethylene isophthalate, poly-bis-(1,4-hydroxymethyl)cyclohexene terephthalate, poly-1,4-butylene terephthalate, poly(4,4' - dihydroxy diphenyl - 2,2 - propane) terephthalate, polycaprolactone and polypivalolactone, the naphthalene being a solvent for the polymer with a dissolving power of at least one part by weight of the polymer per 100 parts by weight of naphthalene, naphthalene being chemically stable in relation to said polymer at a temperature above the melting point of naphthalene at which the polymer is soluble in naphthalene.

3. Solid thermoplastic-polymer-containing particles having a particle range below 500 microns, each particle of which comprising uniformly dispersed therein
   (a) 100 parts by weight of a moldable and grindable anhydrous organic substance which is solid at 25° C. and has a molecular weight of no more than 1000 and
   (b) at least 1 and at most 100 parts by weight, not exceeding saturation concentration in (a), of a thermoplastic polyester polymer which is solid at 25° C.,
the organic substance being a solvent for the polyester polymer with a dissolving power of at least 1 part by weight of the polymer per 100 parts by weight of the solvent, the solvent being chemically stable in relation to said polymer at a temperature above the melting point of said solvent at which the polyester polymer is soluble in the solvent and being a member selected from the group consisting of $\epsilon$-caprolactam, camphor, N,N'-dimethyl urea, N,N-dimethyl urea, trimethylurea, ethylene carbonate 1,2-3,4,5,6 - hexachlorocyclohexane, hexachloroethane, N-cyclohexyl succinimide, N-methylcyclohexylsuccinimide and N-dimethylcyclohexyl succinimide.

4. Particles according to claim 3, having a particle size range between 20 and 400 microns.

5. A powder fraction according to claim 3, having a particle size range between 40 and 90 microns.

6. Solid thermoplastic-polymer-containing particles according to claim 3 which consist essentially of a uniform dispersion of (a) and (b).

7. A method for preparing particles having a particle size range below 500 microns and containing solid polymer dissolved or uniformly dispersed therein, the method comprising the steps:
   (a) admixing and heating:
      (1) 100 parts by weight of moldable and grindable anhydrous organic aromatic substance which is solid at 25° C., has a molecular weight of at most 1000, dissolves at least 1 part by weight of the polymer per 100 parts by weight of the organic substance and is stable and chemically inert to the polymer at such temperature and
      (2) from 1 to 100 parts by weight, but not in excess of its solubility in (1), of thermoplastic polyester polymer which is solid at 25° C.
   up to a temperature above the melting point of the organic substance until a homogeneous liquid dispersion or solution of polymer in the organic substance is formed;
   (b) cooling the liquid dispersion or solution, which consists essentially of the anhydrous organic substance and the thermoplastic polymer, to a temperature below the melting point of the organic substance, thereby solidifying said organic dispersion or solution;
   (c) comminuting the resulting solidified dispersion or solution until particles having a particle size range below 500 microns are obtained;
   (d) separating and recovering polymer powder from said organic substance.

8. A method according to claim 7, wherein the polymer powder is separated and recovered by means of elutriation of said organic substance.

9. A method according to claim 7, wherein the polymer powder is separated and recovered by means of extraction of said organic substance.

10. A method according to claim 7, wherein said organic substance is sublimed off at temperatures below the polymer melting point.

11. A method according to claim 7, wherein said organic substance is distilled off at temperatures below the polymer melting point.

12. A method according to claim 10 wherein said organic substance is sublimed off at a temperature below the polymer sticking temperature.

13. A method according to claim 11 wherein said organic substance is distilled off at a temperature below the polymer sticking temperature.

References Cited

UNITED STATES PATENTS

| | | | |
|---|---|---|---|
| 3,536,645 | 10/1970 | Miller | 260—28.5 R |
| 2,530,852 | 11/1950 | Bixby | 260—34.2 |
| 3,214,402 | 10/1965 | Gobel | 260—31.2 XA |
| 3,186,961 | 1/1965 | Sears | 260—33.6 R |
| 3,294,741 | 12/1966 | Schnell | 260—33.6 R |
| 3,625,877 | 12/1971 | Jackson | 260—33.8 R |
| 3,386,935 | 6/1968 | Jackson | 260—31.8 XA |
| 3,597,383 | 8/1971 | Shrontz | 260—33.8 R |

OTHER REFERENCES

A. H. Warth: "Chemistry and Technology of Waxes," 2nd ed., 1956, Reinhold Pub. Co., pp. 453-457, 486-492.

MORRIS LIEBMAN, Primary Examiner

P. R. MICHL, Assistant Examiner

U.S. Cl. X.R.

117—21; 260—30.4 R, N, 31.6, 31.8 R, N, XA, PQ, 32.2, 32.6 R, N, PQ, 32.8 R, N, 33.2 R, 33.4 R, P, PQ, UR, 33.6 R, PQ, UB, UA, 33.8 R, UB, UA, 34.2